(12) United States Patent
Park et al.

(10) Patent No.: US 9,216,389 B2
(45) Date of Patent: Dec. 22, 2015

(54) POROUS POLYMER MEMBRANE WITH COVALENT NETWORK STRUCTURE AND PRODUCTION METHOD THEREOF

(71) Applicant: GWANGJU INSTITUTE OF SCIENCE AND TECHNOLOGY, Gwangju (KR)

(72) Inventors: Ji Woong Park, Gwangju (KR); Jae Sung Bae, Gwangju (KR); Su Young Moon, Gwangju (KR)

(73) Assignee: GWANGJU INSTITUTE OF SCIENCE AND TECHNOLOGY, Gwangju (KR)

( * ) Notice: Subject to any disclaimer, the term of this patent is extended or adjusted under 35 U.S.C. 154(b) by 113 days.

(21) Appl. No.: 13/646,061

(22) Filed: Oct. 5, 2012

(65) Prior Publication Data
US 2014/0039079 A1    Feb. 6, 2014

(30) Foreign Application Priority Data

Aug. 6, 2012 (KR) .................. 10-2012-0085930

(51) Int. Cl.
| | | |
|---|---|---|
| B01D 67/00 | (2006.01) | |
| B01D 53/22 | (2006.01) | |
| B01D 61/14 | (2006.01) | |
| B01D 69/14 | (2006.01) | |
| B01D 71/58 | (2006.01) | |
| B01D 71/68 | (2006.01) | |
| B01D 71/54 | (2006.01) | |
| B01D 71/28 | (2006.01) | |

(52) U.S. Cl.
CPC .......... *B01D 67/0006* (2013.01); *B01D 53/228* (2013.01); *B01D 61/145* (2013.01); *B01D 67/009* (2013.01); *B01D 69/141* (2013.01); *B01D 71/28* (2013.01); *B01D 71/54* (2013.01); *B01D 71/58* (2013.01); *B01D 71/68* (2013.01)

(58) Field of Classification Search
CPC ...... B01D 67/006; B01D 67/28; B01D 67/54; B01D 67/58
USPC ........................................................ 521/27
See application file for complete search history.

(56) References Cited

U.S. PATENT DOCUMENTS

| | | | | |
|---|---|---|---|---|
| 6,630,520 B1 * | 10/2003 | Bruza et al. | ............... | 521/77 |
| 7,141,188 B2 * | 11/2006 | Li et al. | ............... | 252/570 |
| 8,029,857 B2 * | 10/2011 | Hoek et al. | ............... | 427/245 |
| 2010/0010440 A1 * | 1/2010 | Parsonage et al. | ........ | 604/103.06 |
| 2010/0249309 A1 * | 9/2010 | Lewin et al. | ............... | 524/445 |
| 2011/0174728 A1 * | 7/2011 | Eisen et al. | ............. | 210/500.21 |
| 2012/0095123 A1 * | 4/2012 | Park et al. | ............. | 521/163 |
| 2012/0318731 A1 * | 12/2012 | Elbahri et al. | ........... | 210/500.25 |
| 2013/0213881 A1 * | 8/2013 | Diallo et al. | ............. | 210/500.23 |

FOREIGN PATENT DOCUMENTS

KR     20010088679 A  *  4/2011

OTHER PUBLICATIONS

English-language abstract of KR-20010088679-A (published Apr. 2011) obtained from the European Patent Office.*
Machine translation of KR-20010088679-A (published Apr. 2011) obtained from the European Patent Office.*
The Polymer Society of Korea, 2011, Annual Fall Meeting Proceedings, Oct. 6, 2011, 2 pages.

* cited by examiner

*Primary Examiner* — Melissa Rioja
(74) *Attorney, Agent, or Firm* — Nath, Goldberg & Meyer; Joshua B. Goldberg; Scott H. Blackman

(57) ABSTRACT

The present disclosure provides a porous polymer membrane having a covalent network structure and a method for producing the same. The method includes: polymerizing a first monomer having four first functional groups oriented in a tetrahedral arrangement with a second monomer having at least two second functional groups to prepare porous organic framework nanoparticles; mixing the solution of the porous organic framework nanoparticles with a polymer; and applying the mixed solution to a substrate, followed by heating to form a polymer matrix containing the nanoparticles. According to the method, a polymer membrane with excellent chemical stability, heat resistance, durability and permeability can be produced through simple processes. Advantageously, the porous structure of the polymer membrane can be easily modified depending on intended applications of the polymer membrane.

10 Claims, 10 Drawing Sheets

(a)

(b)

Silica dispersion
(silica particle diameter: 48 nm)

POROUS POLYMER MEMBRANE WITH COVALENT NETWORK STRUCTURE AND PRODUCTION METHOD THEREOF

CROSS-REFERENCE TO RELATED APPLICATION

This application claims priority to Korean Patent Application No. 10-2012-0085930 filed on Aug. 6, 2012 and all the benefits accruing therefrom under 35 U.S.C. §119, the contents of which are incorporated by reference in their entirety.

BACKGROUND

1. Technical Field

The present invention relates to a polymer membrane having a covalent network structure and a method for producing the same. More particularly, the present invention relates to a porous polymer membrane including porous organic framework nanoparticles and a polymer matrix, and a method for producing the porous polymer membrane.

2. Description of the Related Art

Porous membranes as membranes for use in membrane separation processes can be broadly classified into symmetric membranes whose cross section has a uniform structure as a whole, and asymmetric membranes consisting of a thin active layer having fine pores and a support layer having larger pores. Such an asymmetric membrane can be produced by a phase inversion method using a homogeneous single-phase polymer solution and has the advantage of high permeability due to the introduction of the thin active layer.

When it is intended to produce a membrane suitable for an intended application by a phase inversion method, removal of a solvent, addition of a non-solvent and temperature regulation should be accurately conducted during phase inversion, causing inconvenience in precisely controlling various processing conditions, including humidity, evaporation rate of the solvent, kind of the non-solvent and drying conditions. Further, the phase inversion brings about considerably low mechanical strength and poor chemical stability of the polymer membrane. Since an active layer and a support layer of the membrane are simultaneously formed using a homogeneous polymer solution, there exists a practical limitation in improving the permeation performance of the polymer membrane.

Under these circumstances, research has been conducted on composite membranes in which an active layer is formed on a porous support layer made of different materials by interfacial polymerization, and nanocomposite membranes into which porous nanoparticles are introduced to achieve improved permeation performance.

Examples of porous materials suitable for use in the nanocomposite membranes into which porous nanoparticles are introduced include metal-organic frameworks (MOFs). A group led by Omar Yaghi, U.S.A. has conducted pioneer research on microporous coordination polymers of MOFs in which metal ions are three-dimensionally connected to a hydrocarbon organic compound to form micropores. During synthesis, carboxylic acids at both ends of the organic compound exist as anions and are coordinated to the metal cations. That is, the organic compound acts as a ligand connecting both metal ions. However, a MOF composed of a ligand, such as 1,4-benzene dicarboxylic acid, and a transition metal ($Zn_4O$) cluster, which was proposed by the Yaghi's group, has a large specific surface area but is known to be susceptible to moisture upon exposure to air. A group led by Ferey, France, has presented a MOF material in which 1,3,5-benzene tricarboxylic acid as a ligand is bonded to Cr metal ions. This MOF material also has a large specific surface area but has poor resistance to temperature, which limits its use in various applications.

PRIOR ART PUBLICATIONS

Patent Publications (Patent Publication 1) Korean Patent Registration No. 10-1117175

BRIEF SUMMARY

The present invention has been made in view of the above problems and is intended to provide a method for producing a polymer membrane by which chemical instability, low mechanical strength and inconvenience arising from precise control of processing conditions, which are problems encountered in the use of phase inversion methods for the production of porous membranes, can be solved. The present invention is also intended to provide a highly permeable polymer membrane that has excellent characteristics in terms of mechanical strength, thermal stability, chemical resistance and processability, thus being readily applicable to various fields.

In accordance with an aspect of the present invention, there is provided a porous polymer membrane. The porous polymer membrane includes: porous organic framework nanoparticles prepared by polymerization of a first monomer having four first functional groups oriented in a tetrahedral arrangement and a second monomer polymerizable with the first monomer and having at least two second functional groups; and a polymer matrix containing the nanoparticles, wherein the first functional groups are selected from amino, isocyanate, acyl halide and ester groups, provided that when the first functional groups are selected from isocyanate, acyl halide and ester groups, the second functional groups are amino groups, and provided that when the first functional groups are amino groups, the second functional groups are selected from isocyanate, acyl halide and ester groups.

The first monomer may be a compound represented by any one of Formulae 1 to 3:

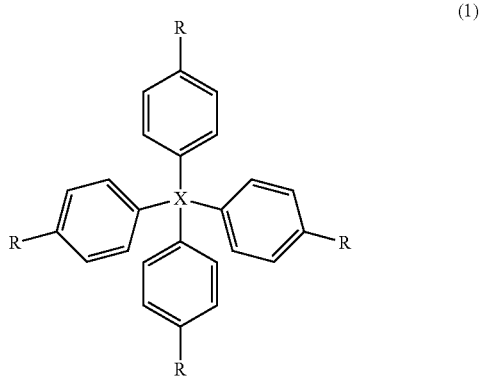

(1)

wherein each R is an amino, isocyanate, acyl halide or ester group, and X is a carbon or silicon atom,

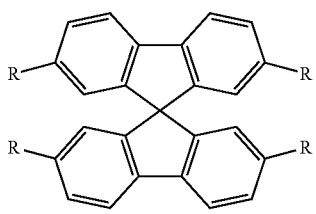
(2)

wherein each R is an amino, isocyanate, acyl halide or ester group, and

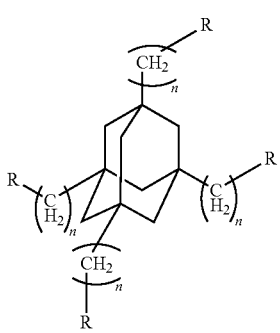
(3)

wherein each R is an amino, isocyanate, acyl halide or ester group, and n is 0 or 1.

The second monomer may be a $C_1$-$C_{20}$ aliphatic or $C_6$-$C_{30}$ aromatic compound substituted with two to four second functional groups. Preferably, the second monomer is a compound represented by any one of Formulae 4 to 11:

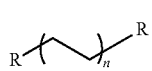
(4)

wherein each R is an amino, isocyanate, acyl halide or ester group, and n is an integer from 2 to 6,

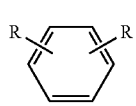
(5)

wherein each R is an amino, isocyanate, acyl halide or ester group,

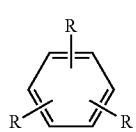
(6)

wherein each R is an amino, isocyanate, acyl halide or ester group,

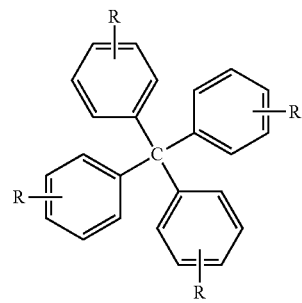
(7)

wherein each R is an amino, isocyanate, acyl halide or ester group,

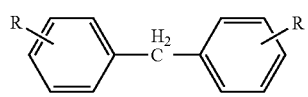
(8)

wherein each R is an amino, isocyanate, acyl halide or ester group,

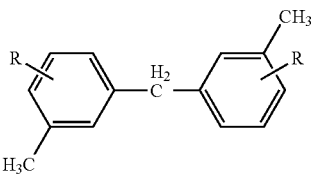
(9)

wherein each R is an amino, isocyanate, acyl halide or ester group,

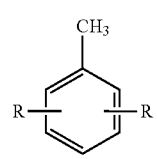
(10)

wherein each R is an amino, isocyanate, acyl halide or ester group, and

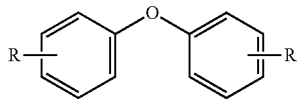
(11)

wherein R is an amino, isocyanate, acyl halide or ester group.

The nanoparticles may exist in the form of aggregates that are dispersed in the polymer matrix or may be connected to each other in the polymer matrix to form a network.

The polymer membrane may include pores formed at the interfaces between the polymer phase the covalent network phase in the polymer matrix.

The polymer may be selected from polysulfone, polyethersulfone, polyacrylonitrile, polyimide, polyetherimide, polybenzimidazole, polyethylene glycol, polymethyl methacrylate, polystyrene, polyetheretherketone, polyvinylidene fluoride, and mixtures thereof.

In accordance with another aspect of the present invention, there is provided a method for producing a porous polymer membrane. The method includes: preparing a monomer solution containing a first monomer having four first functional groups oriented in a tetrahedral arrangement and a second monomer polymerizable with the first monomer and having at least two second functional groups, wherein the first functional groups are selected from amino, isocyanate, acyl halide and ester groups, provided that when the first functional groups are selected from isocyanate, acyl halide and ester groups, the second functional groups are amino groups, and provided that when the first functional groups are amino groups, the second functional groups are selected from isocyanate, acyl halide and ester groups; polymerizing the first monomer with the second monomer in the monomer solution to prepare porous organic framework nanoparticles; mixing the solution of the porous organic framework nanoparticles with a polymer; and applying the mixed solution to a substrate, followed by heating to form a polymer matrix containing the nanoparticles.

In the method, the proportions of the nanoparticles and the polymer in the mixed solution can be adjusted to control the spatial distribution of the nanoparticles present in the matrix.

In the method, pores can be formed at the interfaces between the polymer phase and the covalent network phase in the polymer matrix due to a difference in shrinkage between the polymer phase and the covalent network phase when the mixed solution is evaporated to remove the solvent during heating.

According to the present invention, a polymer membrane with excellent chemical stability, heat resistance, durability and permeability can be produced through simple processes, such as application and heating of a mixed solution of porous organic framework nanoparticles and a polymer. Specifically, phase separation between the nanoparticles and the polymer interacts with gelation of the nanoparticles in the course of the production of the polymer membrane. This interaction allows the polymer membrane to have various structures and characteristics. In addition, additional pore formation can be induced at the interfaces between the covalent network phase and the polymer phase to facilitate modification of the porous structure depending on intended applications of the polymer membrane.

The effects of the present invention are not limited to the above-mentioned effects and other effects not mentioned above will be clearly understood by those skilled in the art from the following description.

BRIEF DESCRIPTION OF THE DRAWINGS

The above and other aspects, features, and advantages of the present invention will become apparent from the detailed description of the following embodiments in conjunction with the accompanying drawings, in which.

DETAILED DESCRIPTION

Figure 1:
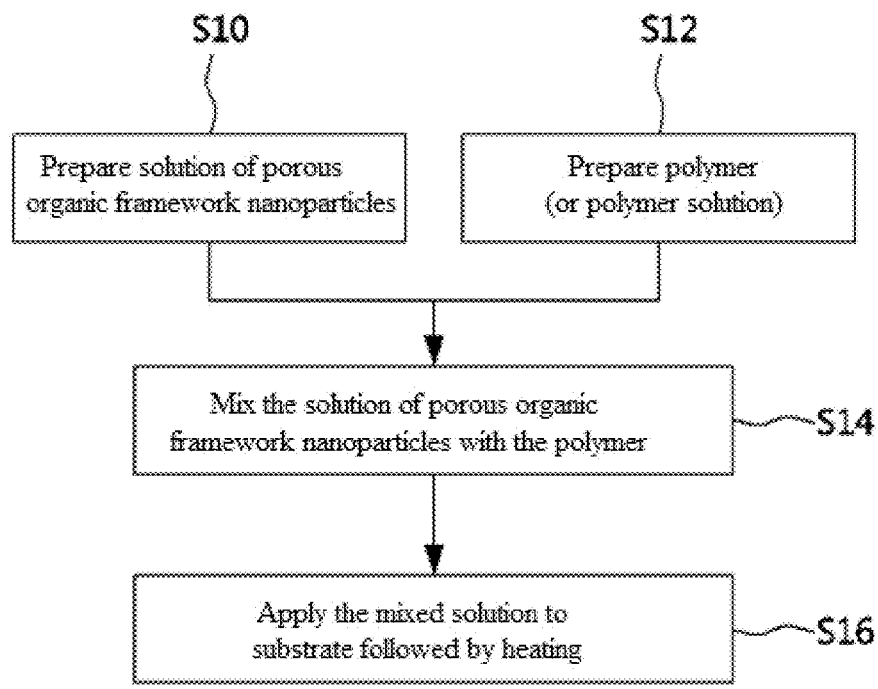
FIG. 1 is a flowchart showing a method for producing a porous polymer membrane according to an embodiment of the present invention.

Preferred embodiments of the present invention will now be described in detail with reference to the accompanying drawings. However, it should be noted that the present invention may be embodied in various different forms without being limited to the illustrated embodiments and is intended to embrace all equivalents and substitutions that fall within the spirit and scope of the appended claims.

While such terms as "first" and "second," etc., may be used to describe various components, such components must not be limited to the above terms. The above terms are used only to distinguish one component from another.

In the drawings, the relative thicknesses of layers and regions may be exaggerated or reduced for clarity.

In describing the present invention, a detailed description of related known functions or configurations are omitted in order to avoid making the subject matter of the present invention unnecessarily unclear.

FIG. 1 is a flowchart showing a method for producing a porous polymer membrane according to an embodiment of the present invention.

Referring to FIG. 1, porous organic framework nanoparticles (hereinafter referred to simply as 'nanoparticles') are dissolved in a solvent and a polymer is prepared (S10, S12).

The solvent may be an organic solvent. Examples of such organic solvents include, but are not limited to, dimethylformamide (DMF), dimethylacetamide (DMAc), N-methyl-2-pyrrolidone (NMP), dimethyl sulfoxide (DMSO), tetrahydrofuran (THF) and ethanol.

The step of preparing the solution of the nanoparticles may include preparing a monomer solution containing a first monomer having four first functional groups oriented in a tetrahedral arrangement and a second monomer polymerizable with the first monomer and having at least two second functional groups; and polymerizing the first monomer with the second monomer in the monomer solution.

The first functional groups of the first monomer and the second functional groups of the second monomer are different from each other and are selected from amino, isocyanate, acyl halide and ester groups. For example, when the first functional groups are selected from isocyanate, acyl halide and ester groups, the second functional groups may be amino groups. Alternatively, when the first functional groups are amino groups, the second functional groups may be selected from isocyanate, acyl halide and ester groups.

For example, the first monomer may be a compound represented by any one of Formulae 1 to 3:

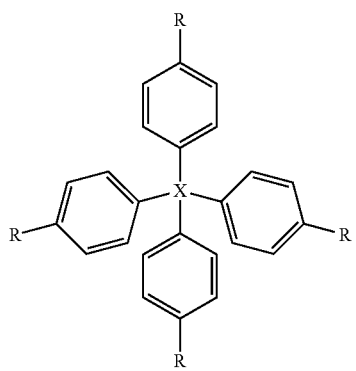

(1)

wherein each R is an amino, isocyanate, acyl halide or ester group, and X is a carbon or silicon atom,

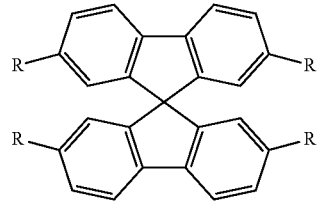

(2)

wherein each R is an amino, isocyanate, acyl halide or ester group, and

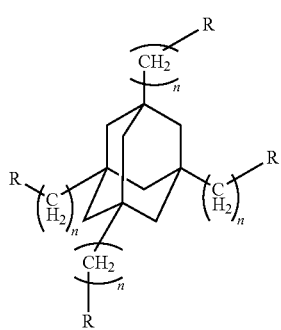

(3)

wherein each R is an amino, isocyanate, acyl halide or ester group, and n is 0 or 1.

The second monomer may be a $C_1$-$C_{20}$ aliphatic or $C_6$-$C_{30}$ aromatic compound substituted with two to four second functional groups.

For example, the second monomer may be a compound represented by any one of Formulae 4 to 11:

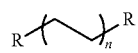

(4)

wherein each R is an amino, isocyanate, acyl halide or ester group, and n is an integer from 2 to 6,

(5)

wherein each R is an amino, isocyanate, acyl halide or ester group,

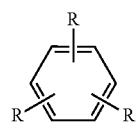

(6)

wherein each R is an amino, isocyanate, acyl halide or ester group,

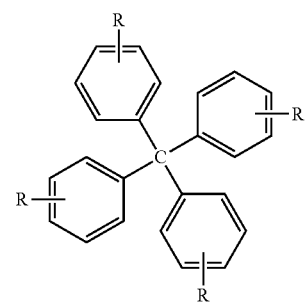

(7)

wherein each R is an amino, isocyanate, acyl halide or ester group,

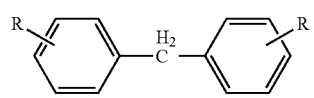

(8)

wherein each R is an amino, isocyanate, acyl halide or ester group,

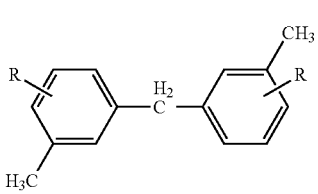

(9)

wherein each R is an amino, isocyanate, acyl halide or ester group,

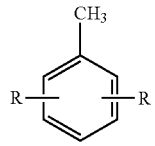

(10)

wherein each R is an amino, isocyanate, acyl halide or ester group, and

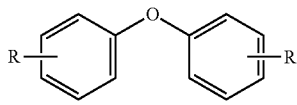

(11)

wherein R is an amino, isocyanate, acyl halide or ester group.

The first monomer is polymerized with the second monomer by nucleophilic addition or substitution reactions between the first functional groups of the first monomer and the second functional groups of the second monomer. The resulting polymers may be crosslinked with each other by additional nucleophilic addition or substitution reactions with unreacted functional groups. As a result, a three-dimensional organic network (a network structure) can be formed in which the polymers are connected to each other via strong covalent bonds starting from the tetrahedral first monomer acting as a kind of crosslinking point.

That is, the porous organic framework nanoparticles prepared by polymerization between the first and second monomers are polymerized and crosslinked three-dimensionally. As a result of the polymerization and crosslinking, the porous organic framework nanoparticles have a structure of organic porous bodies in the form of particles having a great number of micropores and a huge specific surface area. The high crosslinking rate and strong covalent bonds can ensure good chemical resistance, heat resistance and durability of the porous organic framework nanoparticles.

The solution containing the porous organic framework nanoparticles tends to gel as the degree of polymerization or the degree of crosslinking increases. The gelation rate is dependent upon the concentration of the mixed monomers. Accordingly, the monomer solution can be controlled in a sol state by adjusting the concentration of the monomer solution to an appropriate level. The sol state refers to an intermediate stage before gelation.

Subsequently, the solution of the porous organic framework nanoparticles is mixed with the polymer (S14).

The solution containing the porous organic framework nanoparticles may be mixed with the polymer without undergoing additional purification. That is, the solution can be used as-prepared from the monomer solution. If needed, the solution may be purified before mixing with the polymer.

The polymer may be a thermosetting or thermoplastic resin that is usually used in a general polymer membrane. For example, the polymer may be selected from polysulfone, polyethersulfone, polyacrylonitrile, polyimide, polyetherimide, polybenzimidazole, polyethylene glycol, polymethyl methacrylate, polystyrene, polyetheretherketone, polyvinylidene fluoride, and mixtures thereof.

The polymer in the form a solid may be mixed with the solution containing the nanoparticles or may be dissolved in a proper solvent, such as DMF, DMAc, NMP, DMSO, THF or ethanol, before mixing with the solution containing the nanoparticles.

Next, the mixed solution is applied to a substrate and heated to form a polymer matrix containing the nanoparticles (S16).

In this step, phase separation occurs between the polymer phase and the covalent network phase in the matrix and percolation may occur between the nanoparticles due to an interaction between the nanoparticles. The interaction between the nanoparticles is covalent bonding due to reactions between the functional groups present in the nanoparticles, i.e. reactions between unreacted first functional groups of the nanoparticles and unreacted second functional groups of other nanoparticle, or physical bonding (van der Waals attraction, etc.) between the nanoparticles.

In addition, when the mixed solution is evaporated to remove the solvent during heating, the nanoparticles undergo a sol-gel transition from sol to gel (i.e. gelation). At this time, a difference in shrinkage between the polymer phase and the covalent network phase may lead to the formation of pores at the interfaces between the polymer phase and the covalent network phase.

Accordingly, phase separation between the polymer and the covalent network, gelation of the nanoparticles, and the difference in shrinkage between the polymer and the covalent network in the course of the formation of the polymer matrix containing the nanoparticles allow to the final porous polymer membrane to have various structure and pore sizes. Considering this in view of the production processes of the polymer membrane, the microstructure of the polymer membrane can be controlled by various factors, such as polymerization time of the monomers in the course of the preparation of the nanoparticles, the properties of the nanoparticles (properties associated with covalent bonding or physical bonding between the nanoparticles), the kind and molecular weight of the selected polymer, and the composition ratio of the nanoparticles to the polymer. Therefore, the factors can be appropriately varied to selectively produce polymer membranes having desired characteristics depending on intended use.

Figure 2:
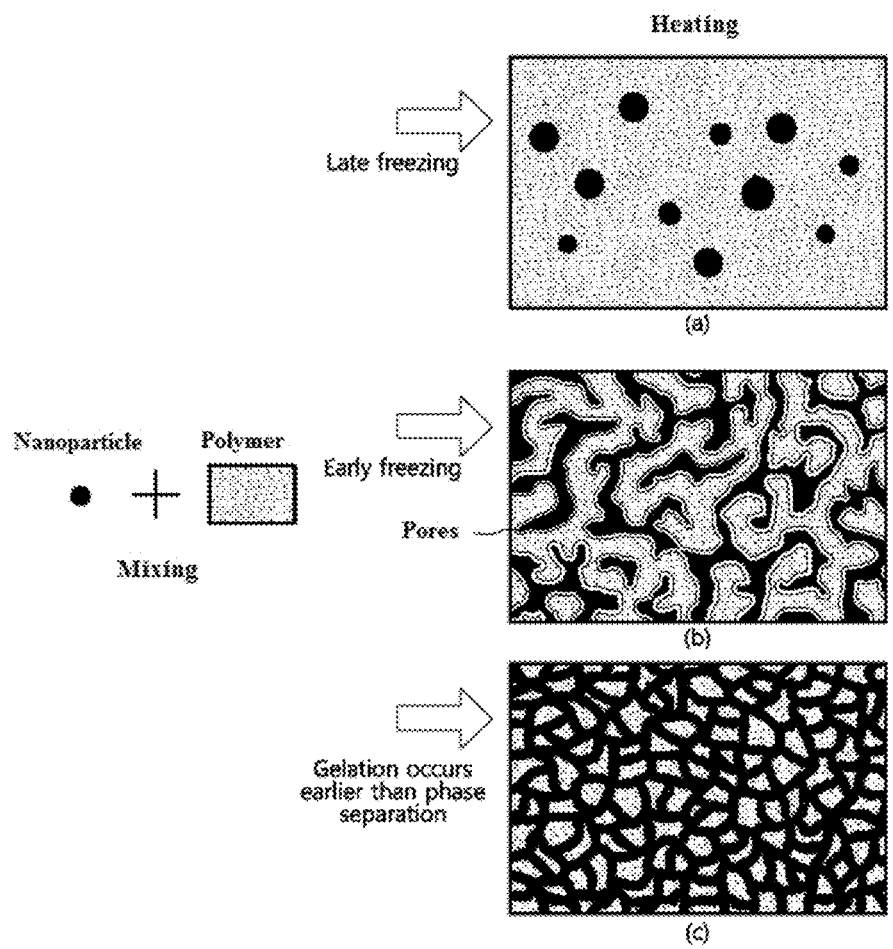
FIG. 2 schematically shows porous polymer membranes that can be produced in accordance with embodiments of the present invention.

For example, the proportions of the nanoparticles and the polymer in the mixed solution may be varied to produce various porous polymer membranes, as shown in FIG. 2.

Referring to FIG. 2, as the proportion of the nanoparticles in the mixed solution increases, the porous polymer membrane may have various structures, including (i) a structure in which the nanoparticles aggregate and are dispersed in the polymer matrix ((a) in FIG. 2), and (ii) network structures in which the nanoparticles are connected to each other in the polymer matrix ((b) and (c) in FIG. 2). The porous polymer membrane may have (iii) a structure in which pores are formed at the interfaces between the polymer phase and the covalent network phase in the polymer matrix ((b) in FIG. 2).

The structure (i) may be obtained when a sol-gel reaction of the nanoparticles occurs slower than phase separation between the covalent network and the polymer ("late freezing process"). This is because an insufficient concentration of the nanoparticles in the mixed solution makes it impossible to form a network between the nanoparticles and the structure (i) is predominantly influenced by phase separation, resulting in aggregation of the nanoparticles.

Figure 3:
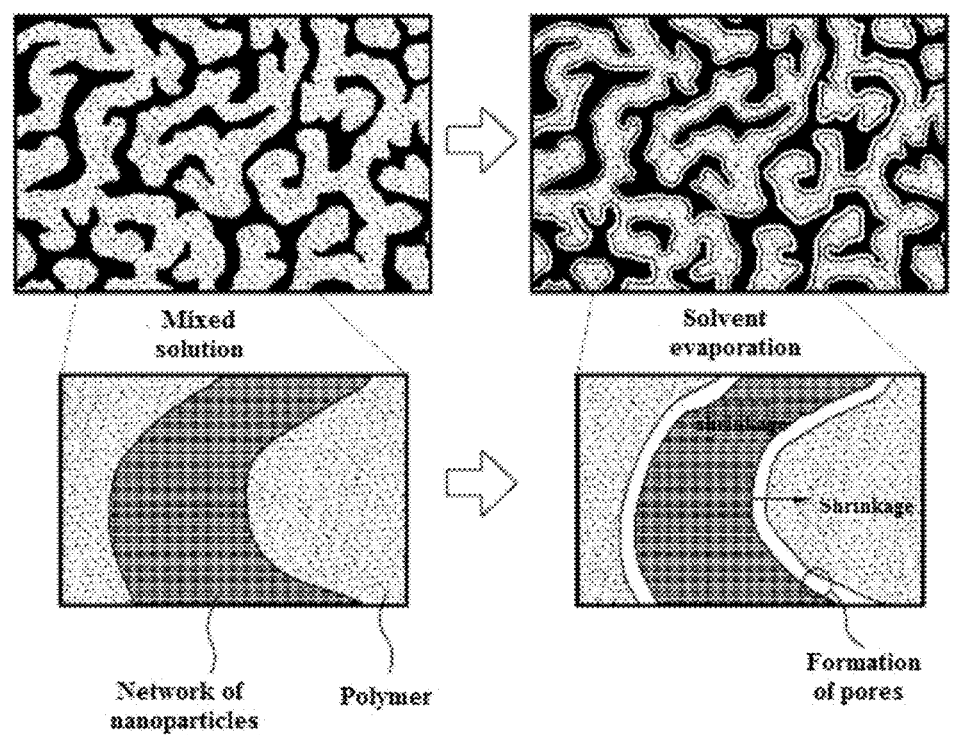
FIG. 3 schematically shows the formation procedure of pores at the interfaces between a polymer phase and a covalent network phase due to a difference in shrinkage between the phases when a solvent is removed by evaporation.

The structures (ii) may be obtained when gelation occurs relatively early by the use of the mixed solution having a concentration of the nanoparticles higher than that in the structure (i). That is, since gelation of the nanoparticles occurs earlier than that in the structure (i), a transient structure induced by phase separation is frozen at the initial stage of phase separation ("early freezing process"). Accordingly, the structures (ii) may have a network structure in which the nanoparticles are connected to each other. In addition, aggregation of the nanoparticles by phase separation is less likely to occur than that in the structure (i). However, when the concentration of the nanoparticles is not sufficiently high, the network of the nanoparticles has a sparse structure and domains of the polymer defined by the network are large in size. Accordingly, as shown in FIG. 3, pores can be formed at the interfaces between the polymer phase and the covalent network phase due to a difference in shrinkage between the polymer phase and the covalent network phase when the mixed solution is evaporated to remove the solvent during heating.

The structure (iii) may be obtained when gelation of the nanoparticles occurs earlier than phase separation by the use of the mixed solution having a concentration of the nanoparticles higher than that in the structures (ii). Due to a very high content of the nanoparticles, the network structure (iii) of the nanoparticles may be denser and more homogeneous than the structures (ii).

In conclusion, although phase separation is induced between the nanoparticles and the polymer in the mixed solution in the course of the production of the polymer membrane, the specific structure of the polymer membrane can be determined by a sol-gel reaction rate at which the nanoparticles are gelled. The sol-gel reaction rate may be determined by the concentration of the nanoparticles in the mixed solution.

The mixed solution may be applied by a solution process, such as spin coating, dip coating, spray coating, casting or doctor blade coating. The solution process may be suitably selected taking into consideration factors of the mixed solution, such as viscosity.

The following examples are provided to assist in further understanding of the invention and are not intended to limit the invention.

EXAMPLES

Production Example 1

Preparation of Solution (Sol) of Porous Organic Framework Nanoparticles

Tetra(4-aminophenyl)methane ($M_W$=382.50, 0.232 g, 0.607 mmol) was dissolved in N,N-dimethylformide (DMF) to prepare a 4% (w/v) organic solution. 1,6-Diisocyanatohexane ($M_w$=168.19, 0.204 g 1.214 mmol) was dissolved in DMF to prepare a 4% (w/vol) organic solution. Then, the tetra(4-aminophenyl)methane solution was slowly added to the 1,6-diisocyanatohexane solution to prepare a monomer solution. The monomer solution was allowed to polymerize under a nitrogen atmosphere at room temperature for 62 hr, affording a solution of porous organic framework nanoparticles.

Production of Porous Polymer Membrane

The solution of the nanoparticles was mixed with polysulfone as a polymer in such an amount that the nanoparticles were present in an amount of 20 wt % with respect to the total weight of the nanoparticles and the polymer (the same applies below). For stabilization, the mixed solution was stirred at 60° C. for 2 hr and at room temperature (25° C.) for 30 min. Subsequently, the stabilized mixed solution was cast on a glass plate and sequentially heated at 50° C., 80° C. and 100° C., each for 2 hr, completing the production of a porous polymer membrane.

Figure 4:
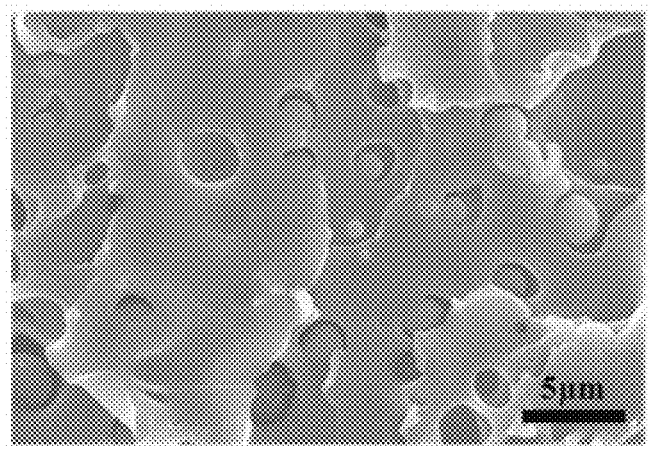
FIG. 4 is a cross-sectional scanning electron microscopy image of a polymer membrane produced in Production Example 1.

FIG. 4 is a cross-sectional scanning electron microscopy image of the polymer membrane produced in Production Example 1. Referring to FIG. 4, phase separation was induced by the polysulfone but poor continuity of the nanoparticles was caused due to the very low content of the nanoparticles. A sol-gel transition of the nanoparticles from sol to gel (gelation) occurred slower than phase separation ("late freezing process"), leading to structural aggregation of the nanoparticles ("self-similar coarsening"). This polymer membrane structure can be expected to find application as a composite membrane for gas separation because additional separation performance can be expected due to the presence of the pores in the nanoparticles in addition to the ability of the polymer matrix to separate gases.

Production Example 2

A solution of nanoparticles was prepared in the same manner as in Production Example 1. The solution of the nanoparticles was mixed with polysulfone in such an amount that the nanoparticles were present in an amount of 40 wt %. For stabilization, the mixed solution was stirred at 60° C. for 2 hr and at room temperature (25° C.) for 30 min. Subsequently, the stabilized mixed solution was cast on a glass plate and sequentially heated at 50° C., 80° C. and 100° C., each for 2 hr, completing the production of a porous polymer membrane.

Figure 5:
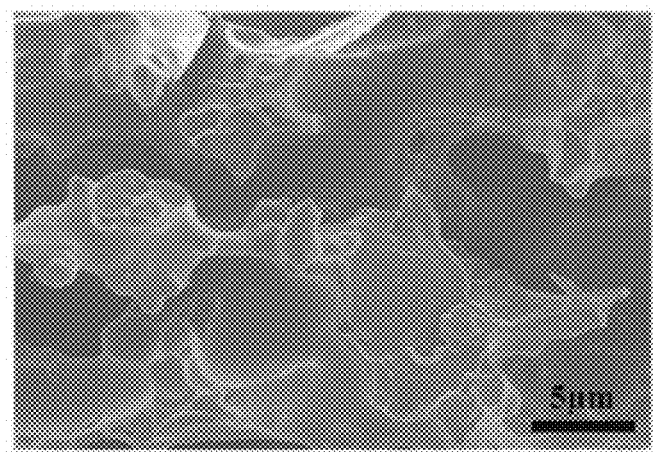
FIG. 5 is a cross-sectional scanning electron microscopy image of a polymer membrane produced in Production Example 2.

FIG. 5 is a cross-sectional scanning electron microscopy image of the polymer membrane produced in Production Example 2. Referring to FIG. 5, the sol-gel reaction of the nanoparticles from sol to gel occurred earlier than that in Production Example 1 (content of the nanoparticles=20 wt %), leading to aggregation of a smaller number of the nanoparticles, and the polymer membrane had a structure in which the nanoparticles were connected in the form of a network. However, the network of the nanoparticles had a sparse structure and domains of the polymer were large in size due to the low content (40 wt %) of the nanoparticles. The structure was confirmed to have a large pore size and a high porosity due to a large difference in shrinkage between the covalent network phase and the polymer phase during heating. This polymer membrane structure is expected to find application as a porous polymer membrane for ultrafiltration or nanofiltration.

Production Example 3

A solution of nanoparticles was prepared in the same manner as in Production Example 1. The solution of the nanoparticles was mixed with polysulfone in such an amount that the nanoparticles were present in an amount of 60 wt %. For stabilization, the mixed solution was stirred at 60° C. for 2 hr and at room temperature (25° C.) for 30 min. Subsequently, the stabilized mixed solution was cast on a glass plate and sequentially heated at 50° C., 80° C. and 100° C., each for 2 hr, completing the production of a porous polymer membrane.

Figure 6:
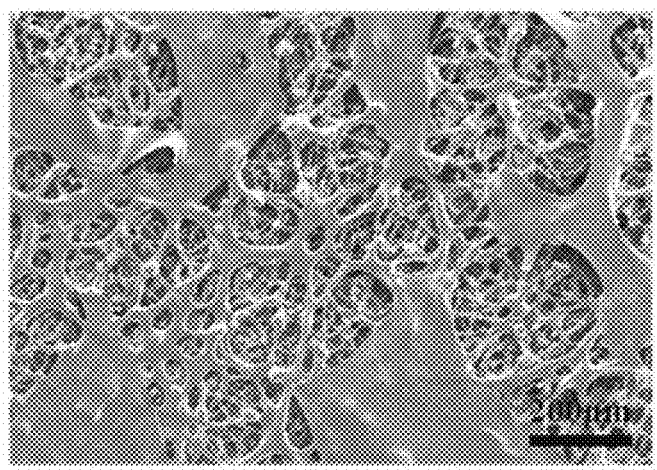
FIG. 6 is a surface (a) and cross-sectional (b) scanning electron microscopy images of a polymer membrane produced in Production Example 3.
Figure 6:
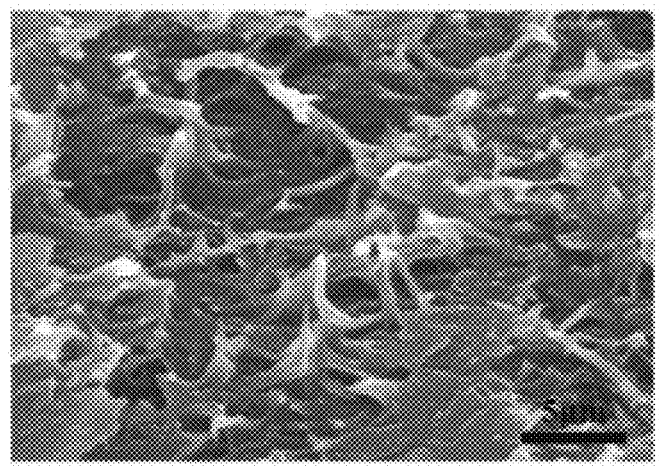

FIG. 6 is a surface (a) and cross-sectional (b) scanning electron microscopy images of the polymer membrane produced in Production Example 3. Referring to FIG. 6, phase separation was induced by mixing of the polysulfone but gelation of the nanoparticles occurred earlier than that in Production Example 1 (content of the nanoparticles=20 wt %) and that in Production Example 2 (content of the nanoparticles=40 wt %). As a result, a transient structure induced by phase separation was frozen at the initial stage of phase separation ("early-freezing process"). The high content (60 wt %) of the nanoparticles led to a high degree of crosslinking and a fine interconnected structure of the nanoparticles without substantial aggregation of the nanoparticles. In addition, a dense network of the nanoparticles and fine polymer domains were formed. The pore size and porosity of the structure were confirmed to be small due to a small difference in shrinkage between the covalent network phase and the polymer phase during heating. This polymer membrane structure is expected to find application as a porous polymer membrane for ultrafiltration or nanofiltration.

Production Example 4

A solution of nanoparticles was prepared in the same manner as in Production Example 1. The solution of the nanoparticles was mixed with polysulfone in such an amount that the nanoparticles were present in an amount of 80 wt %. For stabilization, the mixed solution was stirred at 60° C. for 2 hr and at room temperature (25° C.) for 30 min. Subsequently, the stabilized mixed solution was cast on a glass plate and sequentially heated at 50° C., 80° C. and 100° C., each for 2 hr, completing the production of a porous polymer membrane.

Figure 7:
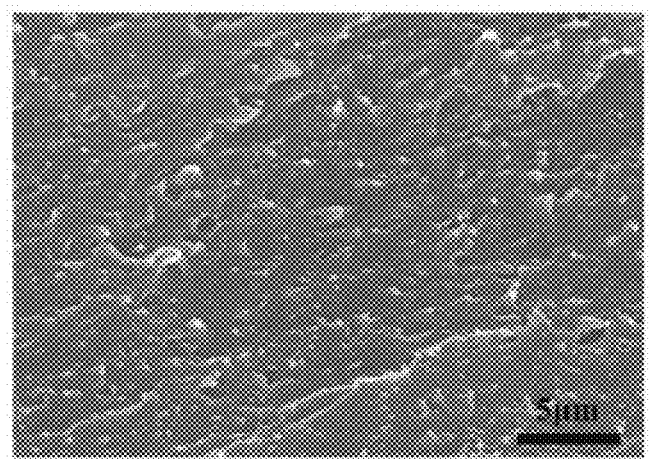
FIG. 7 is a cross-sectional scanning electron microscopy image of a polymer membrane produced in Production Example 4.

FIG. 7 is a cross-sectional scanning electron microscopy image of the polymer membrane produced in Production Example 4. Referring to FIG. 7, the sol-gel reaction of the nanoparticles from sol to gel occurred earlier than phase separation induced by the polysulfone, and the high content (80 wt %) of the nanoparticles allowed the polymer membrane to have a very dense network structure of the nanoparticles and made the polymer membrane homogeneous. Based on the characteristics of the organic molecular network, this polymer membrane structure is expected to find application as a polymer membrane for gas separation. In addition, it is expected that the network structure of the nanoparticles remaining after selective removal of the polymer from the polymer membrane by etching with an etching solution will be used in monolithic applications.

Figure 8A:
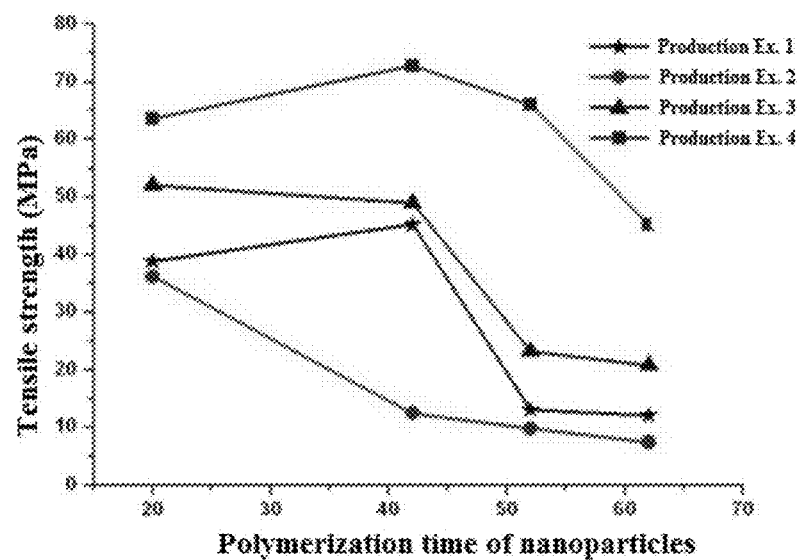
FIGS. 8a and 8b graphically show the tensile strengths (a) and tensile moduli (b) of polymer membranes produced in Production Examples 1 to 4.
Figure 8B:
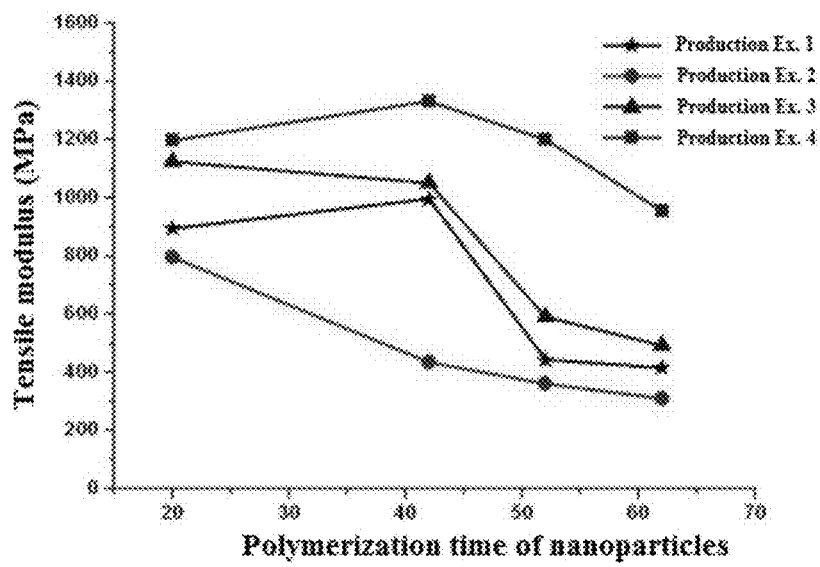

<Characterization of the Polymer Membranes>
Measurement of Mechanical Properties FIGS. 8a and 8b graphically show the tensile strengths (a) and tensile moduli (b) of the polymer membranes produced in Production Examples 1 to 4. In the production examples, the tensile strengths and tensile moduli were measured at different polymerization times while maintaining the inherent contents of the nanoparticles. Referring to FIGS. 8a and 8b, changes in tensile strength and tensile modulus were observed because the sizes of the nanoparticles increased and the gelation rates varied with increasing polymerization time of the nanoparticles.

Table 1 shows the tensile strength and tensile modulus values of the polymer membranes produced in Production Examples 1-4 and a polysulfone porous membrane (Comparative Example 1) produced by a conventional phase inversion method.

TABLE 1

| Polymer membrane | Tensile strength (MPa) | Tensile modulus (MPa) |
|---|---|---|
| Production Example 1 | 12 | 416 |
| Production Example 2 | 8 | 311 |
| Production Example 3 | 21 | 492 |
| Production Example 4 | 45 | 956 |
| Comparative Example 1 | 3 | 33 |

As can be seen from the results in Table 1, the polymer membranes produced in Production Examples 1-4 had higher tensile strength and tensile modulus values than the polymer membrane of Comparative Example 1.

Measurement of Thermal Properties

Figure 9:
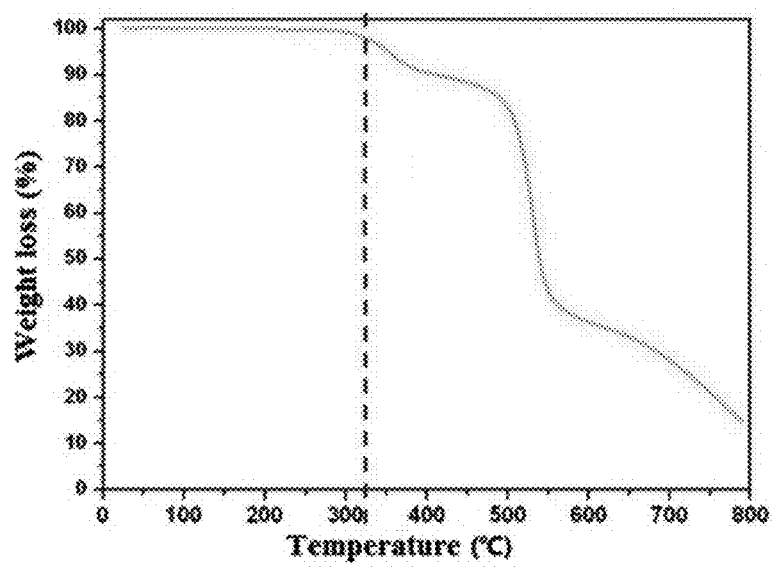
FIG. 9 shows the results of thermogravimetric analysis for a polymer membrane produced in Production Example 4.

FIG. 9 shows the results of thermogravimetric analysis for the polymer membrane produced in Production Example 4. As shown in FIG. 9, the polymer membrane of Production Example 4 was thermally stable up to about 320° C.

Measurement of Permeation Properties

Table 2 shows water permeabilities of the polymer membranes produced in Production Examples 1-4. The water permeation properties were measured using dead-end filtration cells.

TABLE 2

| Polymer membrane | Water permeability (L/m$^2$h) | Applied pressure (bar) |
|---|---|---|
| Production Example 1 | N/A | 60 |
| Production Example 2 | 5050 | 1 |
| Production Example 3 | 1451 | 1 |
| Production Example 4 | N/A | 60 |

As can be seen from the results in Table 2, the polymer membranes produced in Production Examples 2 and 3 were permeable to water, demonstrating their porous structures. The porous membranes can be used for ultrafiltration and nanofiltration. The polymer membranes produced in Production Examples 1 and 4 were impermeable to water. Therefore, the polymer membranes can be used as nanocomposite membranes for gas separation.

Figure 10:
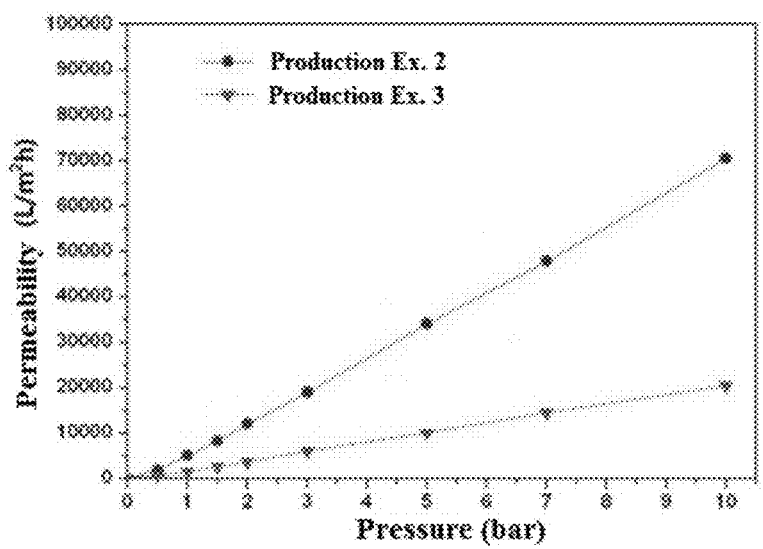
FIG. 10 graphically shows changes in the water permeability of porous membranes produced in Production Examples 2 and 3 with varying pressures.

FIG. 10 graphically shows changes in the water permeability of the porous membranes produced in Production Examples 2 and 3 with varying pressures. The water permeabilities were measured using dead-end filtration cells. Referring to FIG. 10, the permeabilities of the polymer membranes produced in Production Examples 2 and 3 increased with increasing applied pressure. The polymer membranes showed a similar tendency in their permeabilities. However, the polymer membrane produced in Production Example 3 was less permeable to water than that produced in Production Example 2. This appears to be because the polymer membrane produced in Production Example 3 had a higher content of the nanoparticles, leading to the formation of a finer and denser network structure of the nanoparticles and smaller pores.

Figure 11:
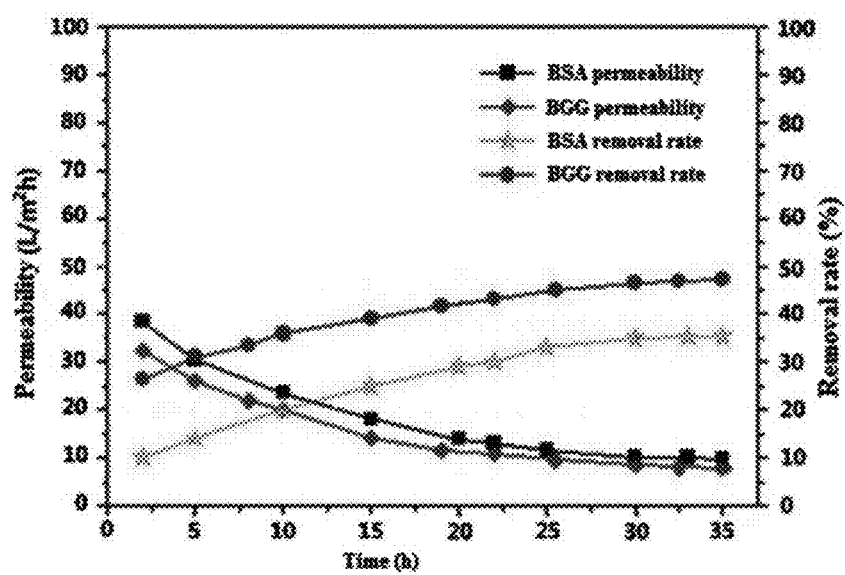
FIG. 11 graphically shows the permeability and removal rate of solutes through a porous membrane produced in Production Example 3.

FIG. 11 graphically shows the permeability and removal rate of solutes through the porous membrane produced in Production Example 3. As the solutes, two proteins, bovine serum albumin (BSA) and bovine gamma globulin (BGG), were used. The proteins were dissolved in water and their time-dependent permeabilities were measured using dead-end filtration cells. Referring to FIG. 11, the polymer membrane produced in Production Example 3 had a removal rate of about 40-50% for the proteins. The polymer membrane had pores larger than the size of the solutes (BSA=about 6 nm, BGG=about 8 nm), thus being suitable as an ultrafiltration membrane for the removal of 2-100 nm sized materials.

Figure 12A:
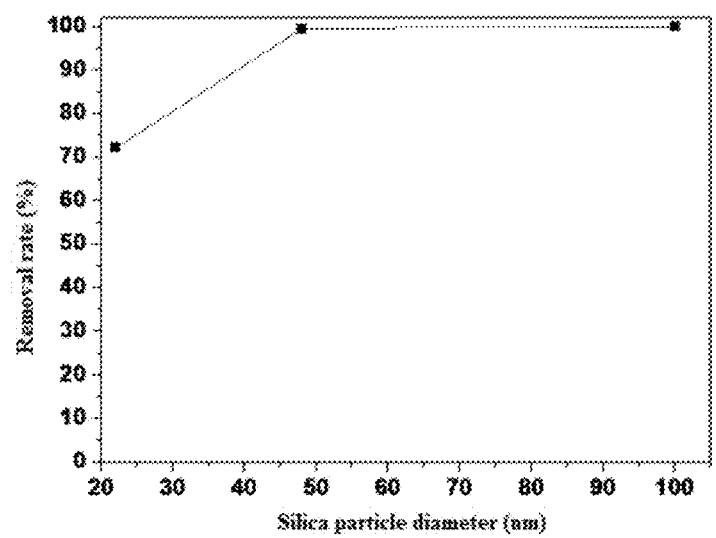
FIGS. 12a and 12b are (a) a graph showing changes in the removal rate of silica through a porous membrane produced in Production Example 3 depending on the silica particle size and (b) photographs of a dispersion of silica before and after filtration.
Figure 12B:
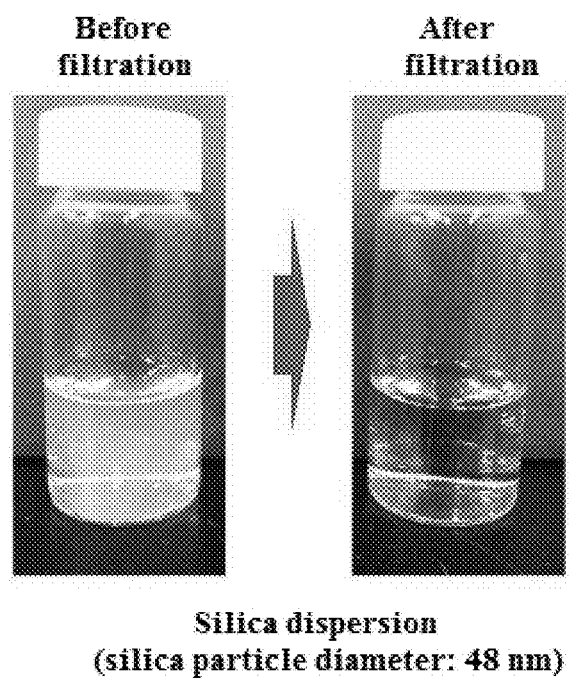

FIGS. 12a and 12b are (a) a graph showing changes in the removal rate of silica through the porous membrane produced in Production Example 3 depending on the silica particle size and (b) photographs of a dispersion of silica before and after filtration. The removal rate of silica from a silica dispersion was measured using dead-end filtration cells. The silica dispersion was an aqueous solution in which spherical silica particles having different sizes of 22 nm, 48 nm and 100 nm were dispersed in water. Referring to FIG. 12a, almost 100% of the silica particles having a size of 48 nm or above were removed. Referring to FIG. 12b, the silica dispersion was turbid in color before passing through the porous polymer membrane (before filtration) and turned transparent after passing through the porous polymer membrane (after filtration).

Although some embodiments have been described herein, it should be understood by those skilled in the art that these embodiments are given by way of illustration only, and that various modifications, variations, and alterations can be made without departing from the spirit and scope of the invention. Therefore, the embodiments and the accompanying drawings should not be construed to limit the technical spirit of the present invention, but should be construed to illustrate the spirit of the present invention. The scope of the invention should be interpreted according to the following appended claims to cover all modifications or variations induced from the appended claims and equivalents thereof.

What is claimed is:

1. A porous polymer membrane comprising organic framework particles and a polymer matrix containing the particles, wherein
   the organic framework particles:
     exist in the form of aggregates that are dispersed in the polymer matrix;
     are connected to each other in the polymer matrix to form a network;
     and are prepared by polymerization of a first monomer having four first functional groups oriented in a tetrahedral arrangement and a second monomer polymerizable with the first monomer and having at least two second functional groups;
       wherein the first functional groups are selected from amino, isocyanate, acyl halide and ester groups, provided that when the first functional groups are selected from isocyanate, acyl halide and ester groups, the second functional groups are amino groups, and when the first functional groups are amino groups, the second functional groups are selected from isocyanate, acyl halide and ester groups,
   wherein the organic framework particles are present in an amount of 40 to 80% by weight, with respect to the total weight of the organic framework particles and the polymer;
   and wherein the polymer membrane comprises pores formed at the interfaces between a polymer phase and a covalent network phase in the polymer matrix due to a difference in shrinkage between the polymer phase and the covalent network phase.

2. The porous polymer membrane according to claim 1, wherein the first monomer is a compound represented by any one of Formulae 1 to 3:

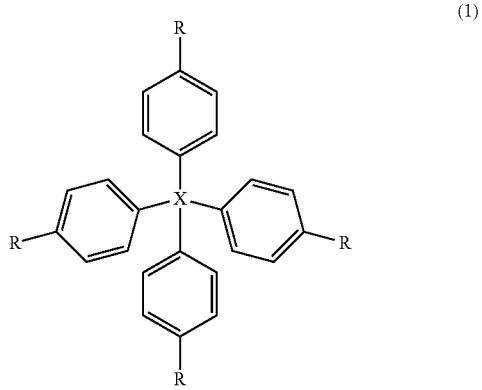

(1)

wherein each R is an amino, isocyanate, acyl halide or ester group, and X is a carbon or silicon atom,

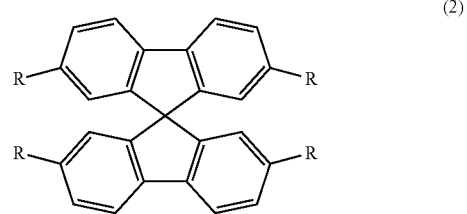

(2)

wherein each R is an amino, isocyanate, acyl halide or ester group, and

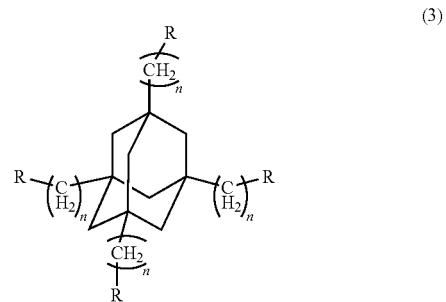

(3)

wherein each R is an amino, isocyanate, acyl halide or ester group, and n is 0 or 1.

3. The porous polymer membrane according to claim 1, wherein the second monomer is a $C_1$-$C_{20}$ aliphatic or $C_6$-$C_{30}$ aromatic compound substituted with two to four second functional groups.

4. The porous polymer membrane according to claim 1, wherein the second monomer is a compound represented by any one of Formulae 4 to 11:

(4)

wherein each R is an amino, isocyanate, acyl halide or ester group, and n is an integer from 2 to 6,

(5)

wherein each R is an amino, isocyanate, acyl halide or ester group,

(6)

wherein each R is an amino, isocyanate, acyl halide or ester group,

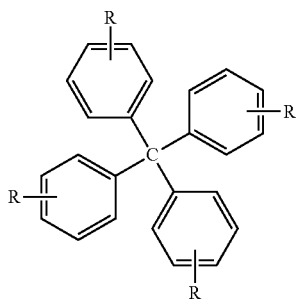

(7)

wherein each R is an amino, isocyanate, acyl halide or ester group,

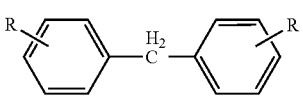

(8)

wherein each R is an amino, isocyanate, acyl halide or ester group,

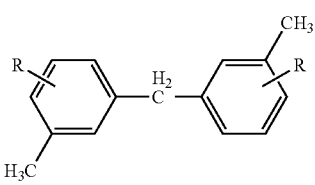

(9)

wherein each R is an amino, isocyanate, acyl halide or ester group,

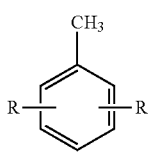

(10)

wherein each R is an amino, isocyanate, acyl halide or ester group, and

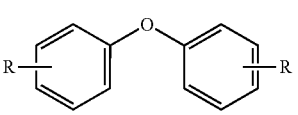

(11)

wherein R is an amino, isocyanate, acyl halide or ester group.

5. The porous polymer membrane according to claim 1, wherein the polymer is selected from polysulfone, polyethersulfone, polyacrylonitrile, polyimide, polyetherimide, polybenzimidazole, polyethylene glycol, polymethyl methacrylate, polystyrene, polyetheretherketone, polyvinylidene fluoride, and mixtures thereof.

6. A method for producing a porous polymer membrane, including organic framework particles in the form of aggregates that are dispersed in a polymer matrix and that are connected to each other forming a network in the polymer matrix, comprising:

preparing a monomer solution containing a solvent and a first monomer having four first functional groups oriented in a tetrahedral arrangement and a second monomer polymerizable with the first monomer and having at least two second functional groups, wherein the first functional groups are selected from amino, isocyanate, acyl halide and ester groups, provided that when the first functional groups are selected from isocyanate, acyl halide and ester groups, the second functional groups are amino groups, and provided that when the first functional groups are amino groups, the second functional groups are selected from isocyanate, acyl halide and ester groups;

polymerizing the first monomer with the second monomer in the monomer solution to prepare the organic framework particles;

mixing the solution of the organic framework particles with a polymer to form a mixed solution wherein the particles are present in an amount of 40% to 80% by weight with respect to the total weight of the organic framework particles and the polymer; and applying the mixed solution to a substrate, followed by heating the mixed solution at a temperature of 50° C. to 100° C., wherein the solvent is evaporated during heating, to form a polymer matrix containing the particles in the form of aggregates that are dispersed in the polymer matrix and that are connected to each other, forming a network in the polymer matrix, wherein pores are formed at the interfaces between a polymer phase and a covalent network phase in the polymer matrix due to a difference in shrinkage between the polymer phase and the covalent network phase when the mixed solution is heated to evaporate the solvent.

7. The method according to claim 6, wherein the first monomer is a compound represented by any one of Formulae 1 to 3:

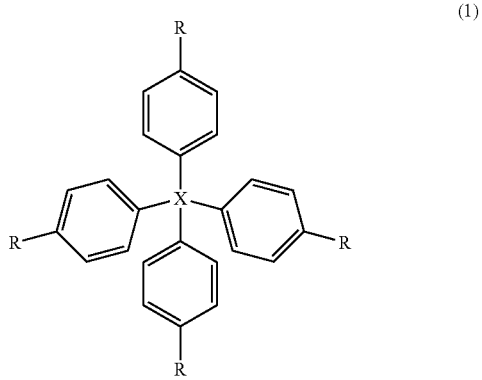

(1)

wherein each R is an amino, isocyanate, acyl halide or ester group, and X is a carbon or silicon atom,

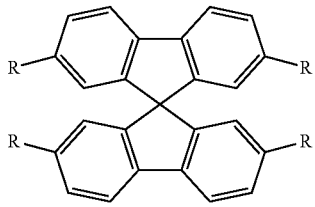
(2)

wherein each R is an amino, isocyanate, acyl halide or ester group, and

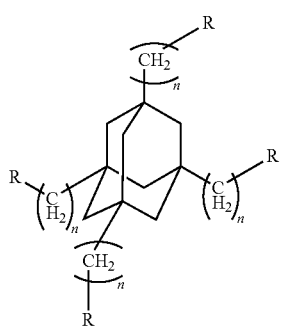
(3)

wherein each R is an amino, isocyanate, acyl halide or ester group, and n is 0 or 1.

8. The method according to claim 6, wherein the second monomer is a $C_1$-$C_{20}$ aliphatic or $C_6$-$C_{30}$ aromatic compound substituted with two to four second functional groups.

9. The method according to claim 6, wherein the second monomer is a compound represented by any one of Formulae 4 to 11:

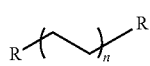
(4)

wherein each R is an amino, isocyanate, acyl halide or ester group, and n is an integer from 2 to 6,

(5)

wherein each R is an amino, isocyanate, acyl halide or ester group,

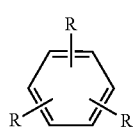
(6)

wherein each R is an amino, isocyanate, acyl halide or ester group,

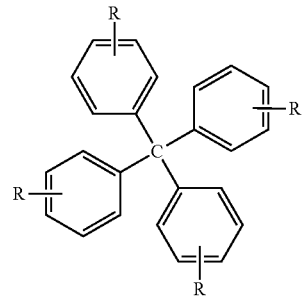
(7)

wherein each R is an amino, isocyanate, acyl halide or ester group,

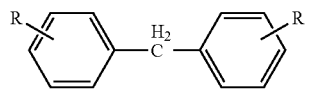
(8)

wherein each R is an amino, isocyanate, acyl halide or ester group,

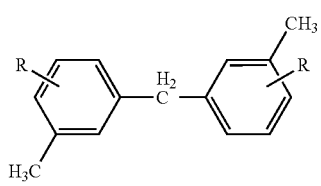
(9)

wherein each R is an amino, isocyanate, acyl halide or ester group,

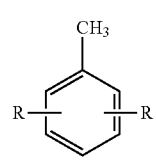
(10)

wherein each R is an amino, isocyanate, acyl halide or ester group, and

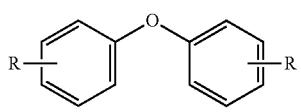
(11)

wherein R is an amino, isocyanate, acyl halide or ester group.

10. The method according to claim 6, wherein the proportions of the particles and the polymer in the mixed solution are adjusted to control the spatial distribution of the particles present in the matrix.

* * * * *